US011223623B1

(12) United States Patent
Kolman et al.

(10) Patent No.: US 11,223,623 B1
(45) Date of Patent: Jan. 11, 2022

(54) METHOD, APPARATUS AND NON-TRANSITORY PROCESSOR-READABLE STORAGE MEDIUM FOR PROVIDING SECURITY IN A COMPUTER NETWORK

(71) Applicant: EMC IP Holding Company LLC, Hopkinton, MA (US)

(72) Inventors: Eyal Kolman, Raanana (IL); Assaf Mendelson, Tel Aviv (IL); Eugene Gulko, Campbell, CA (US); Dan Karpati, Even-Yehuda (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 1203 days.

(21) Appl. No.: 15/198,656

(22) Filed: Jun. 30, 2016

(51) Int. Cl.
*G06F 21/00* (2013.01)
*H04L 29/06* (2006.01)

(52) U.S. Cl.
CPC .......... *H04L 63/101* (2013.01); *H04L 63/068* (2013.01); *H04L 63/105* (2013.01); *H04L 63/108* (2013.01)

(58) Field of Classification Search
CPC ... H04L 63/101; H04L 63/068; H04L 63/108; H04L 63/105
See application file for complete search history.

(56) References Cited

U.S. PATENT DOCUMENTS 10,114,972 B2 * 10/2018 Konik ................. G06F 21/6227
10,152,508 B2 * 12/2018 Weissman ........... G06F 16/2462
2008/0133552 A1 * 6/2008 Leary ................. G06F 16/2465
2014/0149592 A1 * 5/2014 Krishna ................. H04L 67/16
　　　　　　　　　　　　　　　　　　709/226
2015/0269178 A1 * 9/2015 Rhodes ................. G06F 16/958
　　　　　　　　　　　　　　　　　　707/700
2017/0250953 A1 * 8/2017 Jain ..................... H04L 63/0218
2018/0027006 A1 * 1/2018 Zimmermann ..... H04L 63/0245
　　　　　　　　　　　　　　　　　　726/11

OTHER PUBLICATIONS

Bruno Veloso, Carlos Martins, Raphael Espanha, Raul Azevedo, and Joao Gama. Mar. 2020. Fraud detection using heavy hitters: a case study. In Proceedings of the 35th Annual ACM Symposium on Applied Computing (SAC '20). Association for Computing Machinery, New York, NY, USA, 482-489. (Year: 2020).*

* cited by examiner

*Primary Examiner* — Kendall Dolly
(74) *Attorney, Agent, or Firm* — Krishnendu Gupta; Lesley Leonessa

(57) ABSTRACT

There are disclosed techniques for use in providing security in a computer network. In one embodiment, the techniques comprise a method including multiple steps. The method comprises receiving user access data characterizing user access with a protected resource within a computer network. The method also comprises evaluating the user access data to extract information therefrom that describes user access with respect to a feature of user access. The method also comprises determining a cardinality value in connection with the feature based on the extracted information and a maximum cardinality threshold. It should be appreciated that the cardinality value is limited by the maximum cardinality threshold such that the cardinality value cannot exceed the maximum cardinality threshold. The method also comprises presenting the cardinality value for facilitating fraud detection.

14 Claims, 2 Drawing Sheets

METHOD, APPARATUS AND NON-TRANSITORY PROCESSOR-READABLE STORAGE MEDIUM FOR PROVIDING SECURITY IN A COMPUTER NETWORK

TECHNICAL FIELD

The present invention relates generally to computer networks. More particularly, the present invention relates to a method, an apparatus and a non-transitory processor-readable storage medium for providing security in a computer network.

BACKGROUND OF THE INVENTION

Computer networks are often configured to incorporate network security systems in order to protect the networks against malicious activity. Such malicious activity can include, for example, fraudulent access attempts made by human users or possibly by networks of compromised computers or "botnets."

Network security systems can be designed to protect a computer network of a company, organization or other large enterprise comprising many thousands of user devices. However, enterprise computer networks are in many cases continuously growing in size, and often incorporate a diverse array of user devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on user devices can be strained by the demands of large enterprise networks.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, conventional credential-based authentication techniques and other traditional defences typically deployed by enterprise network security systems today often fail at detecting and remediating access anomalies at a sufficiently early stage.

Some network security systems are configured to assess risk in connection with network communications in an attempt to identify the above type of threat. Risk assessment can be based on a number of factors including a cardinality of a field (i.e., how many distinct values are used). However, cardinality measurements require large memory resources when the data sets and the cardinality are large. In order to deal with this issue, various approaches for measuring cardinality have been developed that trade off efficiency against accuracy. However, these approaches are not particularly accurate when the cardinality is small, and many applications require accurate measurements when the cardinality is small. For example, in risk assessment, network security systems may be more interested in domains accessed by a small number of hosts, user-agent strings used by few users, etc. The current measurement approaches are not suitable when the cardinality is small. It is, therefore, necessary for further approaches for measuring cardinality.

SUMMARY OF THE INVENTION

There is disclosed a method, comprising: receiving, by processing circuitry, user access data characterizing user access with a protected resource within a computer network; evaluating, by processing circuitry, the user access data to extract information therefrom that describes user access with respect to a feature of user access; based on the extracted information and a maximum cardinality threshold, determining, by processing circuitry, a cardinality value in connection with the feature, wherein the cardinality value is limited by the maximum cardinality threshold such that the cardinality value cannot exceed the maximum cardinality threshold; and presenting, by processing circuitry, the cardinality value for facilitating fraud detection.

There is also disclosed an apparatus, comprising: memory; and processing circuitry coupled to the memory, the memory storing program code which, when executed by the processing circuitry, cause the processing circuitry to: receive user access data characterizing user access with a protected resource within a computer network; evaluate the user access data to extract information therefrom that describes user access with respect to a feature of user access; based on the extracted information and a maximum cardinality threshold, determine a cardinality value in connection with the feature, wherein the cardinality value is limited by the maximum cardinality threshold such that the cardinality value cannot exceed the maximum cardinality threshold; and present the cardinality value for facilitating fraud detection.

There is also disclosed a non-transitory processor-readable storage medium having stored therein program code of one or more software programs, wherein the program code when executed by processing circuitry causes said processing circuitry to perform a method, the method comprising: receiving user access data characterizing user access with a protected resource within a computer network; evaluating the user access data to extract information therefrom that describes user access with respect to a feature of user access; based on the extracted information and a maximum cardinality threshold, determining a cardinality value in connection with the feature, wherein the cardinality value is limited by the maximum cardinality threshold such that the cardinality value cannot exceed the maximum cardinality threshold; and presenting the cardinality value for facilitating fraud detection.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
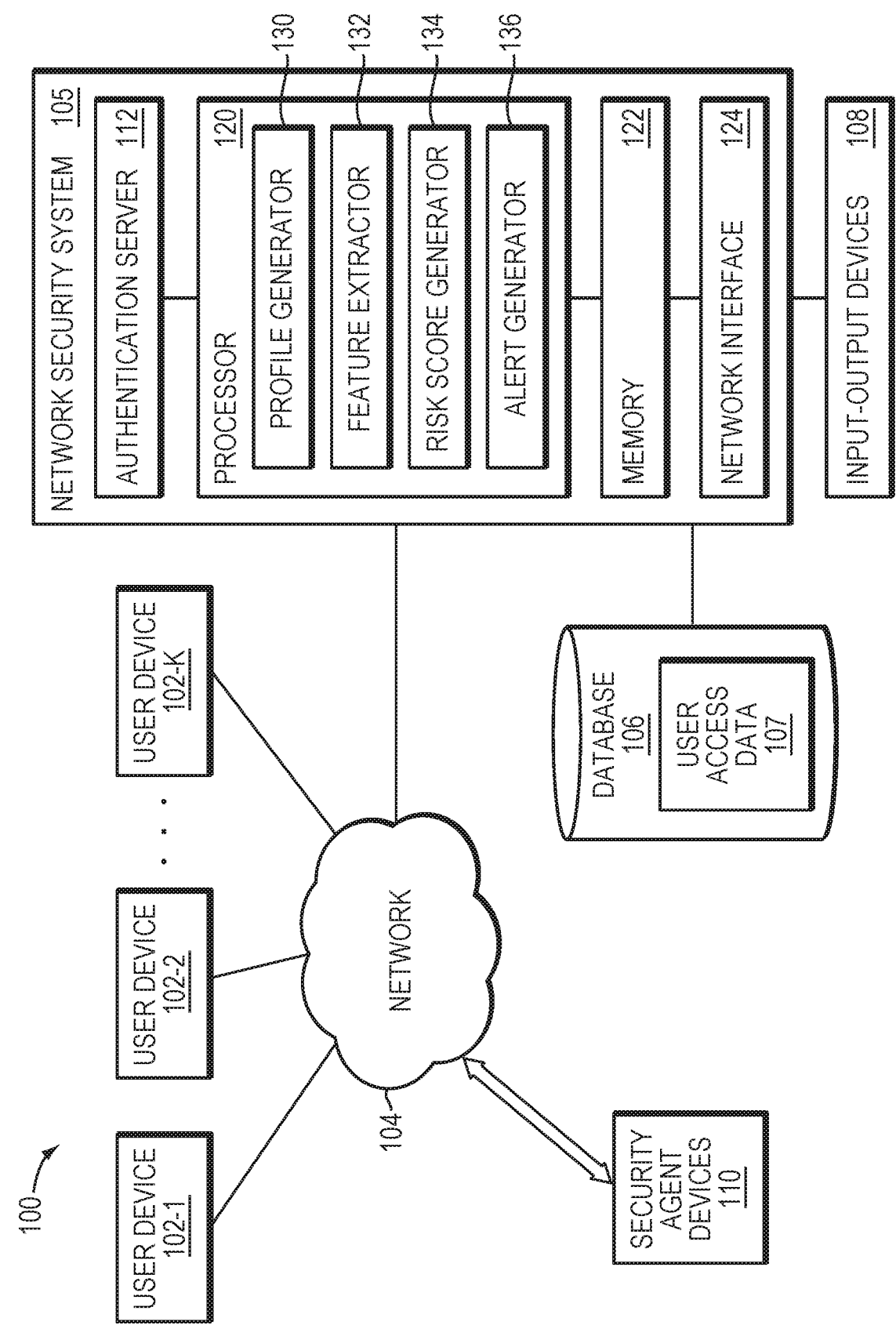
FIG. 1 is a block diagram of a computer network configured for providing security in an illustrative embodiment of the invention.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a network security system 105.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The network security system 105 has an associated database 106 configured to store user access data 107 for each of a plurality of distinct user identifiers. Such user access data can illustratively comprise network sessions data, login data or other types of data characterizing user access to protected resources within the computer network 100, as well as various combinations of multiple distinct types of such data. Network sessions data can include, for example, virtual private network (VPN) session data for VPN connections initiated within the computer network 100. Login data can include, for example, authentication data or other types of login data including timestamps and other information associated with login events. Numerous other types of user access data can be used in a given embodiment.

The database 106 in the present embodiment is implemented using one or more storage systems associated with the network security system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given storage system in an illustrative embodiment.

As indicated previously, the user access data 107 in some embodiments illustratively comprises respective timestamps and other authentication information characterizing successful logins processed in conjunction with users attempting to access protected resources of the computer network 100 via the user devices 102. Other types of login events, network session events or other access events can be processed in computer network 100 in order to generate user access data 107.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

In the present embodiment, alerts generated by the network security system 105 are provided over the network 104 to one or more security agent devices 110. Such devices, like the user devices 102, can illustratively comprise mobile telephones, laptop computers, tablet computers, desktop computers, or other types of computers or processing devices configured for communication over network 104 with the network security system 105. For example, a given security agent device can comprise a mobile telephone equipped with a mobile application configured to receive alerts from the network security system 105 and to provide an interface for a security agent to select particular remedial measures for responding to the alert. Examples of such remedial measures may include logging off the user device in question, or requiring various additional authentication factors for subsequent access attempts made from the user device in question.

It should be noted that a "security agent" as the term is generally used herein may comprise, for example, an automated entity, such as hardware, software or firmware entity running on a processing device. Accordingly, like the above-noted "user," a security agent may but need not comprise a human entity.

The network security system 105 comprises an authentication server 112. Login events initiated at respective ones of the user devices 102 are directed to the authentication server 112 over the network 104 for processing. The authentication server 112 determines if a given access attempt is authentic based on presentation of one or more predetermined authentication factors such as user identifiers, passwords or other factors. Upon verification of the presented authentication factors, the authentication server 112 grants the requesting user device 102 access to one or more protected resources of the computer network 100. Although shown as an element of the network security system 105 in this embodiment, the authentication server 112 in other embodiments can be implemented at least in part externally to the network security system 105, for example, as a stand-alone server, set of servers or other type of authentication system coupled to the network 104.

In the FIG. 1 embodiment, a successful access attempt is assumed to represent a login event for the corresponding user identifier and is logged in the database 106 as part of the user access data 107. Other types of authentication mechanisms and associated login events or other user access data can be used in other embodiments.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the user devices 102 and the security agent devices 110, and illustratively comprises one or more conventional transceivers.

The processor 120 further comprises a profile generator 130, a feature extractor 132, a risk score generator 134 and an alert generator 136.

The profile generator 130 is configured to generate profiles based on user access with protected resources of the computer network 100. Profiles may relate to users or particular features of communications. For example, in one embodiment, a domain profile may be generated that describes the hosts or users that have accessed the domain. The aforementioned profiles are typically based on user access data from multiple user accesses. In addition, at least a subset of the user accesses that facilitate the generation of the profiles are initiated from the user devices 102. As noted above, the user access data 107 illustratively includes information relating to login events associated with respective logins initiated from user devices 102 over the network 104, although additional or alternative types of user access data could be processed in other embodiments. The processed user access data illustratively comprises at least portions of the user access data 107 stored in the database 106, although user access data can be captured and stored for subsequent processing in the network security system 105 of the computer network 100 in other ways.

The feature extractor 132 is further configured to obtain or receive user access data in connection with user access. Also, the feature extractor 132 is configured to extract information that describes user access with respect to a particular feature of user access from the user access data.

The risk score generator 134 is configured to generate a risk score in connection with user access based on one or more factors. In at least one embodiment, the risk score may be based on information extracted by the feature extractor 132 and profile(s) generated by the profile generator 130. The risk score generator 134 generates a risk score indicative of the riskiness in connection with user access.

The alert generator 136 is configured to compare the risk score to a threshold, and to generate an alert relating to user access based on a result of the comparison. The alert in the present embodiment is assumed to be transmitted via the network interface 124 over the network 104 to a security agent associated with one of the security agent devices 110. In other embodiments, multiple alerts of different types can be generated relating to user access.

Additional description regarding more detailed examples of profiles, extracted features, risk scores and comparison thresholds that are used in illustrative embodiments will be provided below.

The arrangement described above advantageously permits the network security system 105 to focus its efforts on the particular ones of the user devices 102 that are most likely to be subject to attacks. Accordingly, the limited resources of the network security system 105 available for attack detection and remediation can be more intelligently and effectively deployed in the computer network 100, resulting in improved performance as well as enhanced security against APTs and other types of attacks.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the profile generator 130, feature extractor 132, risk score generator 134 and alert generator 136 may be implemented at least in part in the form of software that is stored in memory 122 and executed by processor 120. Similarly, at least portions of the authentication server 112 of the network security system 105 can be implemented at least in part in the form of software that is stored in memory 122 and executed by processor 120.

It is to be understood that the particular set of elements shown in FIG. 1 for providing security in a computer network is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and associated elements such as authentication server 112, profile generator 130, feature extractor 132, risk score generator 134 and alert generator 136 can be implemented elsewhere in the computer network 100.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, The Security Division of EMC Corporation of Hopkinton, Mass.

Other embodiments can implement the network security system 105 and its associated authentication server 112 as part of or in conjunction with a security information and event management (SIEM) system, such as the enVision® platform, also commercially available from RSA. Such an SIEM system is also considered another possible example of a "network security system" as that term is broadly used herein. In an embodiment of this type, at least portions of the user access data 107 stored in the database 106 illustratively comprise security logs collected by the SIEM system.

An exemplary process 200 utilizing profile generator 130, feature extractor 132, risk score generator 134 and alert generator 136 of the network security system 105 in computer network 100 will now be described in more detail with reference to the flow diagram of FIG. 2. It is to be understood that this particular process 200 is only an example, and additional or alternative processes can be carried out in other embodiments.

In this embodiment, the process 200 includes steps 210 through 240. These steps are assumed to be performed by the processor 120 utilizing its modules 130, 132, 134 and 136.

In step 210, user access data is received characterizing user access with a protected resource within a computer network. In step 220, the user access data is evaluated to extract information therefrom that describes user access with respect to a feature of user access. In step 230, a cardinality value is determined in connection with the feature based on the extracted information and a maximum cardinality threshold that limits the cardinality value such that it cannot exceed the maximum cardinality threshold. In step 240, the cardinality value is presented for facilitating fraud detection.

In one example use case, user devices 102 send user attempts to access the protected resource in the computer network 100. User access data 107 associated with these attempts is stored in the database 106. Network security system 105 assesses risk by obtaining or receiving the user access data 107 from the database 106. As discussed above, the feature extractor 132 of the network security system 105 upon obtaining the user access data evaluates the data in order to extract information that describes user access with respect to a particular feature of user access. It should be noted that in at least one embodiment the information is extracted with a view to creating a profile by the profile generator 130. For example, information may be extracted relating to a domain so that a domain profile can be created that describes users that have accessed the domain. As a result, the cardinality value may be determined by utilizing the extracted information in the profile and the maximum cardinality threshold which sets the maximum cardinality value. It should be understood that in this particular example the cardinality value refers to the number of distinct users to access the domain as limited by the maximum cardinality threshold. The cardinality value may in turn be presented or communicated to the risk score generator 134 to generate a risk score that indicates the likelihood of fraud. If the risk score exceeds a threshold, the alert generator 136 issues an alert to the security agent device 110.

In light of the above, and as will be described further below, it should be appreciated that the approach for determining cardinality as described herein is simple yet extremely suitable for the small-counts-focused requirements. For example, in one particular implementation, a hash operation may be performed to produce a set of the hashed values (e.g., usernames, etc.) and cardinality is calculated based on that set. The set size may be limited so cardinalities of large counts (i.e., larger than the set maximal size) will be estimated as the maximal set size. This approach generates, as required, almost always zero error for small counts, and large errors for high counts. Additionally, the set allows removing old values and calculating cardinalities only on recent data. This will be described in further detail below.

Additionally, in one particular implementation, a processor creates a data structure that is an array of a given size that is dependent on the maximum cardinality threshold (e.g., 25). The array may contain two values for each element in the array: a hashed value and a timestamp of the last time the value was seen. Whenever a new value is received, the array is evaluated. If some timestamp is older than the allowed time window, it is removed. If there is an element in the array with the same hash, it is updated. If there is no element in the array with the same hash, it is added to the array as long as the maximum cardinality has not been reached (unless the oldest value is replaced with the new value). When the cardinality is required, the array may be evaluated such that all those entries that are too old are removed, and the number of remaining values is the estimation of the cardinality. This can be summarized by the following algorithm, as follows:

1. Initialization: d=[ ]
2. Insertion of value v:
  a. Set h=hash of v
  b. Set lastNone=None
  c. Set update=false
  d. For i=1 to maxSize
    i. If d[i] is None
      1. Set lastNone=i
      2. Continue
    ii. If d[i].time is too old
      1. set d[i] to None
      2. set lastNone=i
      3. continue
    iii. If d[i].value=h
      1. update d[i].time to now
      2. set updated to true
      3. break
  e. if update is false and lastNone is not None
    i. set d[lastNone].time to now
    ii. set d[lastNone].value to h
3. get count
  a. set count to 0
  b. For i=1 to maxSize
    i. If d[i] is None
      1. Continue
    ii. If d[i].time is too old
      1. set d[i] to None
      2. continue
    iii. count=count+1
  c. return count It should be further noted that the approach can be optimized based on the profile of using it such as having a variable with the current size, doing the cleaning only when full, etc. Another variant, as discussed briefly above, is that when the maximum cardinality is reached, the least used value (i.e. the one we touched oldest) is replaced with the new value. This is a better solution when the values change often.

As will be appreciated, using a hash (assuming it is a good one) discussed above has a negligible chance of conflict and therefore does not affect accuracy. Similarly, since usually the timing is not "matched" between high and low cardinality (i.e. a high cardinality will generally remain a high cardinality) it is ensured that a high cardinality does not suddenly turn to a very low cardinality simply because of timeouts.

As a result, this means that the accuracy for low cardinality is extremely high (100% for all practical purposes) while for higher cardinality it starts getting lower accuracy and gets low very quickly (e.g. if we have a max value of 25 and the real value is 1,000,000 we will still have a value of 25 which is a large inaccuracy). The outcome is extremely high accuracy for low values.

Also, by using a standard java hash (4 bytes) per value, the time in hours as an integer (another 4 bytes), and a maximum cardinality of, for example, 25, the memory cost by saving it as a simple array is simply 25*(4+4)=200 bytes. Of course, languages such as java would have their own object overhead but for languages such as C this would be the total size. Just for comparison, using a map (e.g. HashMap<Integer, Integer> in java) would cost an order of almost 1000 bytes due to saving the key and value as objects, having to manage the data entries and using a load factor. It would be even higher if we do not convert the keys to hashes.

The CPU performance cost of inserting in the array is basically a single loop. Since the actual testing is almost trivial this can be done in C*M CPU cycles where M is the maximum size and C is some small constant.

As discussed above, a common problem in connection with cardinality occurs when there is a need to have accurate estimation for low cardinality. For example, when assessing risk, how many distinct users communicated with a suspicious domain, how many different URLs are in the domain, etc. Risky domains are expected to have low cardinalities for these features and benign domains to have high cardinalities. Therefore, it is vital to know if the counter equals to 1 or to 3 but less important if its value is 300 or 500. In these cases, the common cardinality approximations fail since these conventional approaches tend to produce unacceptable errors for small counts.

Advantageously, the invention described herein focuses on small-counts-focused cardinality estimators. That is, cardinality features where smaller values are of interest and larger values are less interesting. Examples include cardinality of URLs of a domain, cardinality of users, etc. These cardinality features focus on small counts because risky domains are expected to have small number of users communicating with them and small number of URLs. In these small-counts-focused cardinality cases, the error for small counts should be almost always zero, and in the rare cases of inaccurate estimation, the error should be very small. On the other hand, the error for large counts can be large. Additionally, the CPU and even more importantly the memory requirements should be as small as possible due to system limitations.

It is assumed in the present embodiment that the current access is processed in real time by the network security system 105, responsive to initiation of the current access within the computer network 100. In other embodiments, the current access can be processed as part of a batch of additional accesses retrieved from the database 106 at one of a plurality of periodic processing intervals. The network security system 105 can therefore be configured to support a real-time processing mode of operation, a batch processing mode of operation, or combinations of real-time processing, batch processing or other types of processing modes.

In some embodiments, the alert is provided to a security agent and one or more automated remedial actions are taken in the network security system 105. For example, the alert may be transmitted over the network 104 to one of the security agent devices 110. Such remedial actions can include terminating the current access or suspending the current access until the one or more additional authentication factors are obtained and verified.

In some embodiments, one or more profiles are updated. For example, the profiles can be continuously or periodically tuned based on one or more additional accesses that occur within the computer network 100.

Additional instances of steps 210 through 240 can be performed responsive to occurrence of additional accesses for respective user identifiers or may otherwise be repeated periodically in order to provide security within the computer network 100.

Figure 2:
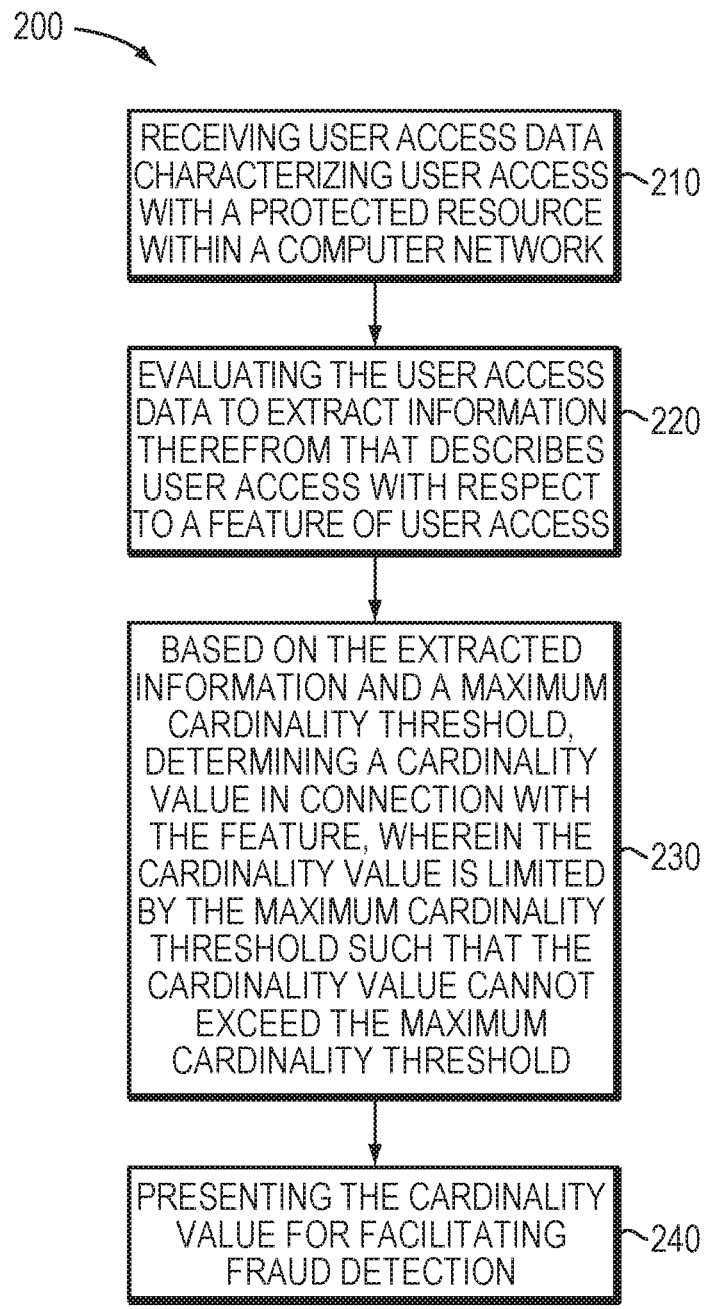
FIG. 2 is a flow diagram of a process for providing security in a computer network in an illustrative embodiment.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to detect access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of anomaly detection, possibly for different user identifiers.

Again, the particular feature extraction, risk score computation and alert generation arrangements described above are exemplary only, and numerous alternative processing arrangements can be used in other embodiments. Accordingly, the various characteristics of these embodiments are intended to be illustrative only and should not be construed as limiting in any way.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, access profiles, risk scores, thresholds, alerts and other components and parameters can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method, comprising:
   receiving, by processing circuitry, user access data characterizing user access with a protected resource within a computer network;
   evaluating, by processing circuitry, the user access data to extract information therefrom that describes user access with respect to a feature of user access;
   based on the extracted information and a maximum cardinality threshold, determining, by processing circuitry, a cardinality value in connection with the feature, wherein the cardinality value is limited by the maximum cardinality threshold such that the cardinality value cannot exceed the maximum cardinality threshold;
   presenting, by processing circuitry, the cardinality value for facilitating fraud detection; and
   creating an array data structure of a size that is dependent on the maximum cardinality threshold for storing information that enables the determination of the cardinality value, wherein each entry of the array data structure comprises a distinct value relating to the feature and a timestamp of the last time that distinct value was received.

2. The method as claimed in claim 1, wherein determining the cardinality value comprises determining a number of distinct values relating to the feature based on the extracted information.

3. The method as claimed in claim 2, wherein determining the cardinality value comprises capping the number of distinct values to the maximum cardinality threshold in the event that the number exceeds the threshold.

4. The method as claimed in claim 1, wherein the timestamp is updated upon receipt of a new value relating to one of the distinct values in the array data structure.

5. The method as claimed in claim 1, wherein the array data structure relates to a time period such that entries in the array data structure are removed once the entries fall outside the time period.

6. An apparatus, comprising:
   memory; and
   processing circuitry coupled to the memory, the memory storing program code which, when executed by the processing circuitry, cause the processing circuitry to:
   receive user access data characterizing user access with a protected resource within a computer network;
   evaluate the user access data to extract information therefrom that describes user access with respect to a feature of user access;
   based on the extracted information and a maximum cardinality threshold, determine a cardinality value in connection with the feature, wherein the cardinality value is limited by the maximum cardinality threshold such that the cardinality value cannot exceed the maximum cardinality threshold;
   present the cardinality value for facilitating fraud detection; and
   create an array data structure of a size that is dependent on the maximum cardinality threshold for storing information that enables the determination of the cardinality value, wherein each entry of the array data structure comprises a distinct value relating to the feature and a timestamp of the last time that distinct value was received.

7. The apparatus as claimed in claim 6, wherein determining the cardinality value comprises determining a number of distinct values relating to the feature based on the extracted information.

8. The apparatus as claimed in claim 7, wherein determining the cardinality value comprises capping the number of distinct values to the maximum cardinality threshold in the event that the number exceeds the threshold.

9. The apparatus as claimed in claim 6, wherein the timestamp is updated upon receipt of a new value relating to one of the distinct values in the array data structure.

10. The apparatus as claimed in claim 6, wherein the array data structure relates to a time period such that entries in the array data structure are removed once the entries fall outside the time period.

11. A non-transitory processor-readable storage medium having stored therein program code of one or more software programs, wherein the program code when executed by processing circuitry causes said processing circuitry to perform a method, the method comprising:

receiving user access data characterizing user access with a protected resource within a computer network;

evaluating the user access data to extract information therefrom that describes user access with respect to a feature of user access;

based on the extracted information and a maximum cardinality threshold, determining a cardinality value in connection with the feature, wherein the cardinality value is limited by the maximum cardinality threshold such that the cardinality value cannot exceed the maximum cardinality threshold;

presenting the cardinality value for facilitating fraud detection; and creating an array data structure of a size that is dependent on the maximum cardinality threshold for storing information that enables the determination of the cardinality value, wherein each entry of the array data structure comprises a distinct value relating to the feature and a timestamp of the last time that distinct value was received.

12. The non-transitory processor-readable storage medium as claimed in claim 11, wherein determining the cardinality value comprises determining a number of distinct values relating to the feature based on the extracted information.

13. The non-transitory processor-readable storage medium as claimed in claim 12, wherein determining the cardinality value comprises capping the number of distinct values to the maximum cardinality threshold in the event that the number exceeds the threshold.

14. The non-transitory processor-readable storage medium as claimed in claim 11, wherein the timestamp is updated upon receipt of a new value relating to one of the distinct values in the array data structure.

* * * * *